US009134562B2

(12) United States Patent
Kim

(10) Patent No.: US 9,134,562 B2
(45) Date of Patent: Sep. 15, 2015

(54) DISPLAY DEVICE

(71) Applicant: Samsung Display Co., Ltd., Yongin (KR)

(72) Inventor: Sang Il Kim, Yongin (KR)

(73) Assignee: Samsung Display Co., Ltd. (KR)

( * ) Notice: Subject to any disclaimer, the term of this patent is extended or adjusted under 35 U.S.C. 154(b) by 278 days.

(21) Appl. No.: 13/862,024

(22) Filed: Apr. 12, 2013

(65) Prior Publication Data

US 2014/0192515 A1 Jul. 10, 2014

(30) Foreign Application Priority Data

Jan. 7, 2013 (KR) .................. 10-2013-0001606

(51) Int. Cl.
*G09F 13/04* (2006.01)
*G02F 1/1335* (2006.01)
(52) U.S. Cl.
CPC .... *G02F 1/133512* (2013.01); *G02F 1/133553* (2013.01)
(58) Field of Classification Search
CPC ............... G02F 1/133553; G02F 1/133528; G02F 1/13363; G02F 1/1337
USPC ........... 362/97.1, 97.2, 97.3, 19, 607; 349/62, 349/65
See application file for complete search history.

(56) References Cited

U.S. PATENT DOCUMENTS

| 5,300,942 | A | 4/1994 | Dolgoff | |
| 8,947,473 | B2 * | 2/2015 | Yee ............................. | 345/690 |
| 2005/0041185 | A1 | 2/2005 | Tanaka et al. | |
| 2006/0290846 | A1 | 12/2006 | Kim | |
| 2007/0024776 | A1 | 2/2007 | Jeng et al. | |
| 2009/0021131 | A1 | 1/2009 | Stark | |
| 2009/0256999 | A1 * | 10/2009 | Ogasawara et al. ............. | 349/64 |
| 2009/0257000 | A1 * | 10/2009 | Ogasawara et al. ............. | 349/64 |
| 2011/0176089 | A1 * | 7/2011 | Ishikawa et al. ................ | 349/65 |

FOREIGN PATENT DOCUMENTS

| EP | 0509630 A2 | 10/1992 |
| EP | 0676902 A2 | 10/1995 |
| JP | 2009-282211 A | 12/2009 |
| JP | 2010-160503 A | 7/2010 |
| KR | 1020020041158 A | 6/2002 |
| KR | 1020110004723 A | 1/2011 |
| KR | 1020110007735 A | 1/2011 |
| KR | 1020120007719 A | 1/2012 |
| KR | 1020120038863 A | 4/2012 |

* cited by examiner

*Primary Examiner* — Ali Alavi
(74) *Attorney, Agent, or Firm* — Innovation Counsel LLP

(57) ABSTRACT

A display device includes a display panel having a plurality of selective light transmitting regions through which light can be controllably transmitted and one or more light blocking regions. It further includes a backlighting unit disposed and configured to supply backlighting light to the display panel and a backlighting light changing layer configured to change one or more optical characteristics (e.g., polarization) of light passed therethrough. The display device further includes a reflection pattern layer disposed between the backlighting light changing layer and the backlighting unit and including a plurality of light-passing regions configured to let light pass therethrough and one or more reflection portions configured to reflect light, where the reflection portions are disposed to intercept, and reflect light coming from the backlighting unit and heading forward to a corresponding one or more of the light blocking regions of the display panel back to the backlighting unit.

20 Claims, 19 Drawing Sheets

DISPLAY DEVICE

CROSS-REFERENCE TO RELATED APPLICATION

Figure 1:
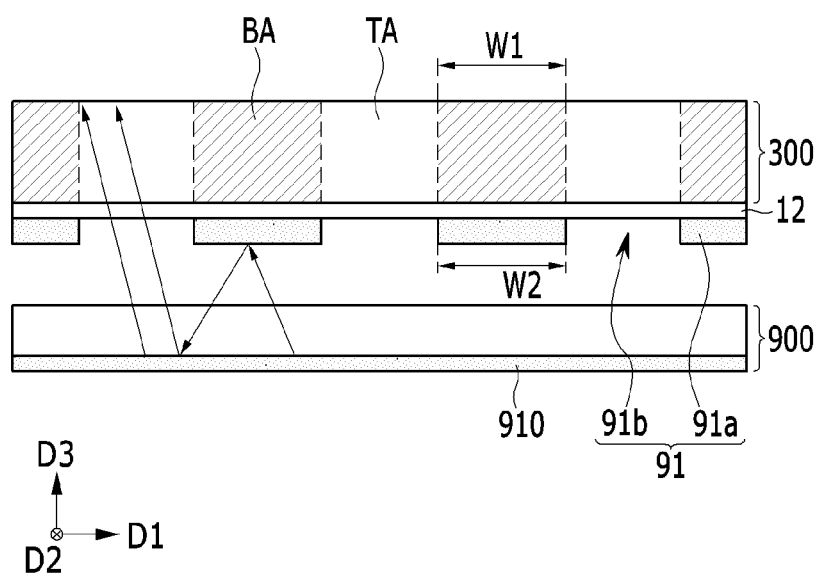

This application claims priority to and the benefit of Korean Patent Application No. 10-2013-0001606 filed in the Korean Intellectual Property Office on Jan. 7, 2013, the entire contents of which application are incorporated herein by reference.

BACKGROUND (a) Technical Field

The present disclosure of invention relates to a display device. More particularly, the present invention relates to a display device including a backlighting unit and to a method of improving energy efficiency of providing backlighting.

(b) Description of Related Technology

Thin panel displays (e.g., flat panel or curved panel displays) may be categorized as self-lighting ones and externally illuminated ones. Examples of self-lighting ones include direct light emitting diode displays (LEDD's), electric field emission displays (EFED's), vacuum fluorescent displays (VFD's), and plasma display panels (PDP's). Examples of externally illuminated thin panel displays include reflective and/or transmissive liquid crystal displays (LCD's), electrically-displaceable dye displays (EDDD's) and electrophoretic displays (EPD's).

The externally illuminated thin panel displays may passively rely on ambient light or they may actively provide their own light for example form an attached backlighting unit (also referred to here as a light source unit). The light source unit may include one or more different types of light sources for generating its light. Examples of the light sources are a cold cathode fluorescent lamp (CCFL), a flat fluorescent lamp (FFL), and a light emitting diode (LED—colored and/or white). Recently, it has become desirable to use light emitting diodes (LED's) in a manner that reduces power consumption and generates less heat.

It is desirable for the backlight unit to provide uniform irradiation to a rear surface of the display panel. Backlighting units may be classified into edge illuminating types, direct backlighting types and hybrid types according to positionings of their respective light sources. The edge illuminating types typically employ a light guide plate (LGP) for redirecting edge-sourced light to be directed uniformly toward the back side of the to-be-backlit display panel.

The display panel includes a plurality of pixels, a plurality of switching elements for selectively driving the pixel electrodes and a plurality of signal lines for supplying control and data signals. The signal lines typically include a plurality of spaced apart gate lines extending in a first lateral direction for transmitting corresponding gate signals to respective rows of switching elements and a plurality of data lines extending in a different second lateral direction for transmitting respective data signals to corresponding columns of switching elements. At least one switching element in each pixel unit is connected to an adjacent gate line and to an adjacent data line for thereby receiving corresponding gate and data voltages.

In more detail, the typical display panel includes controlled light transmission regions (aperture regions) through which light is controllably transmitted, and light blocking regions through which transmission of light is undesirable because light in those regions cannot be appropriately controlled to form a desired image. Accordingly, when light is uniformly emitted from a backlighting unit to a display panel that has light blocking regions, the portions of the output light that fall on the light blocking regions are not transmitted through to form an image and their energy is lost (wasted).

The signal lines of the display panel are typically made of conductive metals, and light may be reflected from lower surfaces of such signal line so as to be reflected back the backlight unit for reuse and attempted transmission through the transmission regions of the display panel. However, when an attempt is made to reuse light in such manner by reciprocating it between not only various metal layers (e.g., signal lines) of the display panel and the backlight unit but also through interposed optical processing layers (e.g., polarizing sheets etc.), much of it may be lost when trying to get through the optical processing layers in the reuse round and it is therefore not efficaciously transmitted back through the display panel for forming a desired image.

As an example of a transmissive and actively illuminated thin panel display, the liquid crystal display (LCD) is that is now widely used and it typically has two spaced apart panels in which respective, electric field generating electrodes are placed, such as pixel electrodes and counterfacing parts of a common electrode. A liquid crystal material layer is interposed between the spaced apart panels. In the liquid crystal display, a voltage is applied to the field generating electrodes to generate an electric field extending into or through the liquid crystal layer. The generated electric field determines the direction of liquid crystal molecules of the liquid crystal layer, and an image is displayed by controlling the polarization of incident light.

The liquid crystal display typically includes at least one polarizer for polarizing the light from the backlight unit before such light enters the LCD panel. The polarizer may be attached to the outside of the LCD panel. In the case of a display device including the polarizer, since light incident inside the display panel is once-polarized light, if that light is reflected from the lower surfaces of the various metal layers inside the display panel back to the backlight unit, the polarization state of the light is changed by the reflection process, and the light with the modified polarization is again passed through the polarizer and its transmittance through the polarizer is decrease due to the reflection-induced change in polarization. Whatever once-reflected light does get through, that light has its polarization state changed by the reflection process in the backlighting unit before it comes back to the backside polarizer of the display panel. In other words, because the above-described process is serially repeated, light efficiency for back-reflected light may substantially drop to effectively become about 0.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention increases a power consumption efficiency of a display device including a backlight unit.

A display device according to an exemplary embodiment includes a display panel including transmitting regions through which light is selectively transmitted and one or more light blocking regions at which light is blocked from being transmitted forward toward a viewing user. The display device further includes a backlight unit irradiating light to the display panel; and a reflection pattern layer positioned between the display panel and the backlight unit. The reflection pattern layer includes one or more reflection parts reflecting light and one or more openings for letting light through, where the reflection portions of the reflection pattern layer are disposed to intercept and reflect back, light coming from the backlight unit and heading forwards towards a corresponding one of the light blocking regions of the display panel.

A lower polarizer is positioned between the display panel and the reflection pattern layer.

A lower film on which the reflection pattern is formed may be included.

The lower film may have birefringence.

The reflection pattern layer may be positioned between the lower film and the display panel.

A width of the reflection part facing the light blocking region may be less than a width of the corresponding light blocking region.

The backlight unit may include a reflection surface reflecting light towards the display panel.

The display panel may include a reflective layer reflecting light backwards and toward the backlighting unit.

The lower film may alternatively have no birefringence.

The lower film may be positioned between the reflection pattern and the display panel.

The openings of the reflection pattern layer may be arranged in a matrix format.

The reflection parts of the reflection pattern layer may be in the shape of spaced apart stripes.

A polarizer piece positioned on a lower surface of the display panel may be further included, wherein the polarizer piece may be positioned in the openings of the reflection pattern layer.

The reflection part of the reflection pattern may have a mesh shape or a striped shape.

According to an exemplary embodiment of the present disclosure, light efficiency of the display device including the backlight unit may be increased by intercepting light that is heading forwards towards one of the light blocking regions before that light passes through the lower polarizer of the display device and reflecting that not-yet polarized light back to the backlighting unit for reuse.

BRIEF DESCRIPTION

FIG. 1 is a cross-sectional view of a display device according to an exemplary embodiment of the present disclosure of invention.

Figure 2:
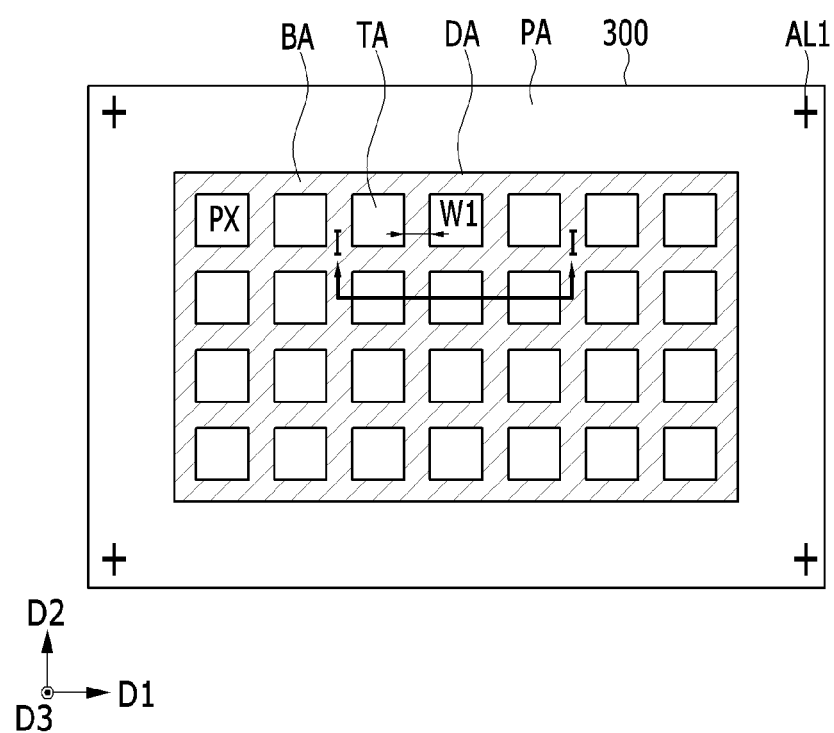
Figure 3:
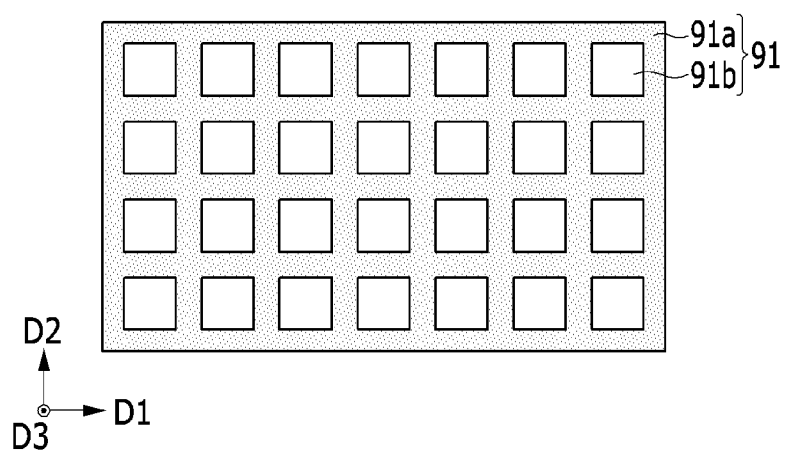
Figure 4:
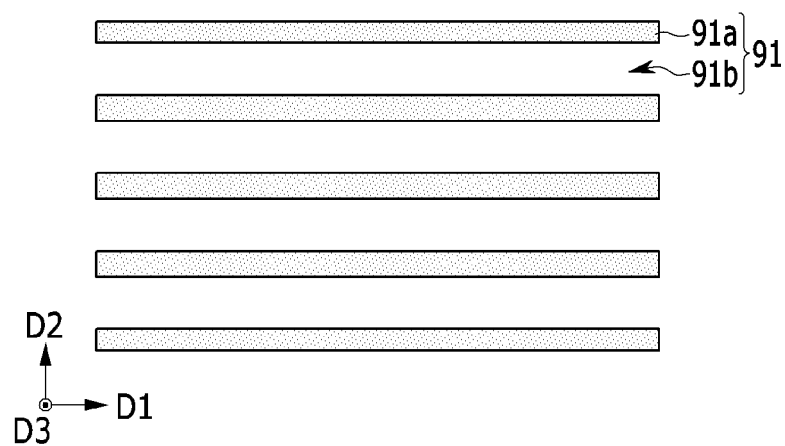
Figure 5:
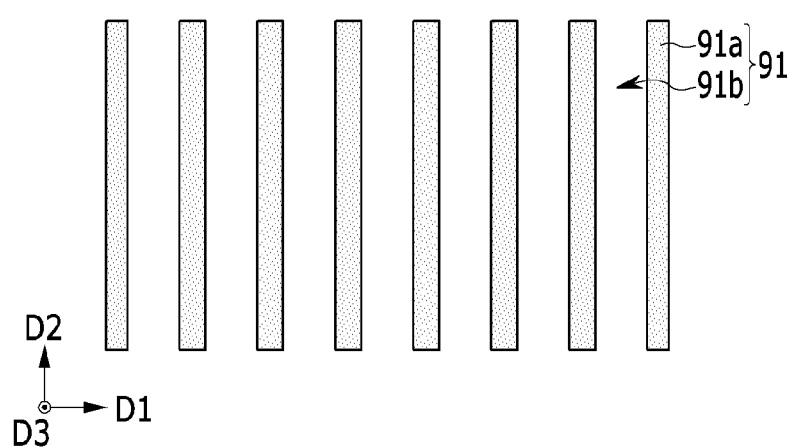
Figure 6:
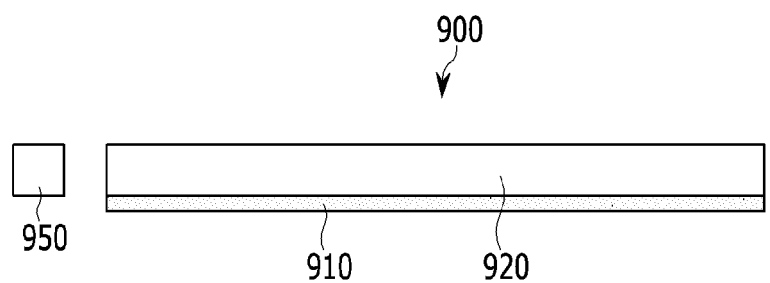
Figure 7:
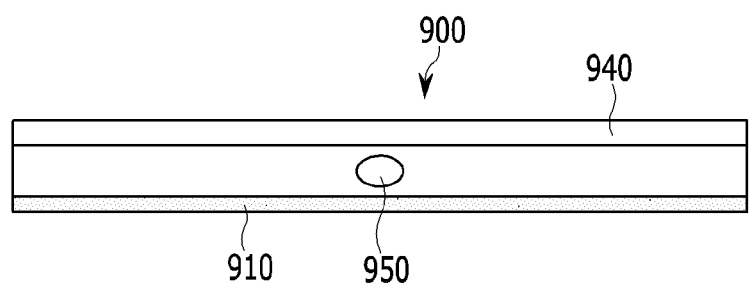
Figure 8:
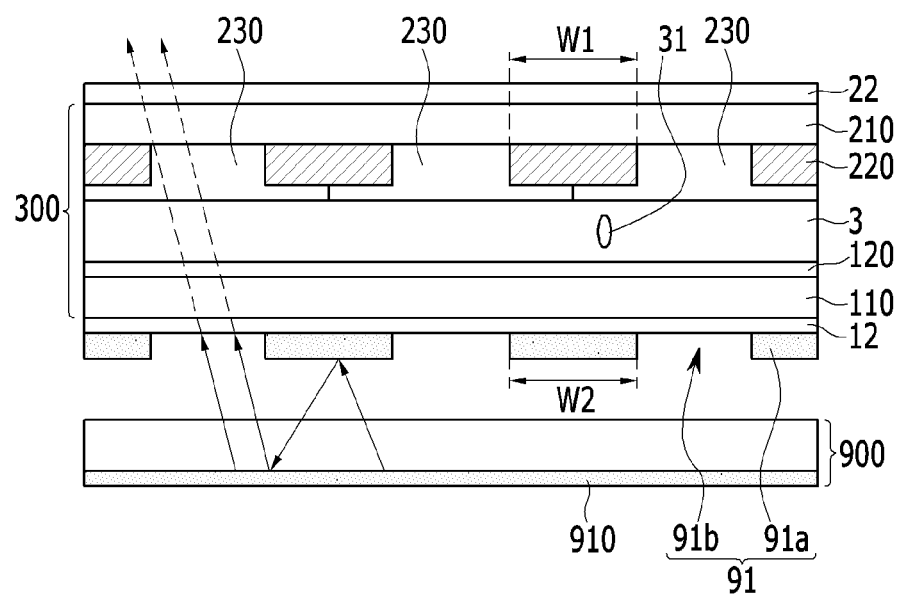
Figure 9:
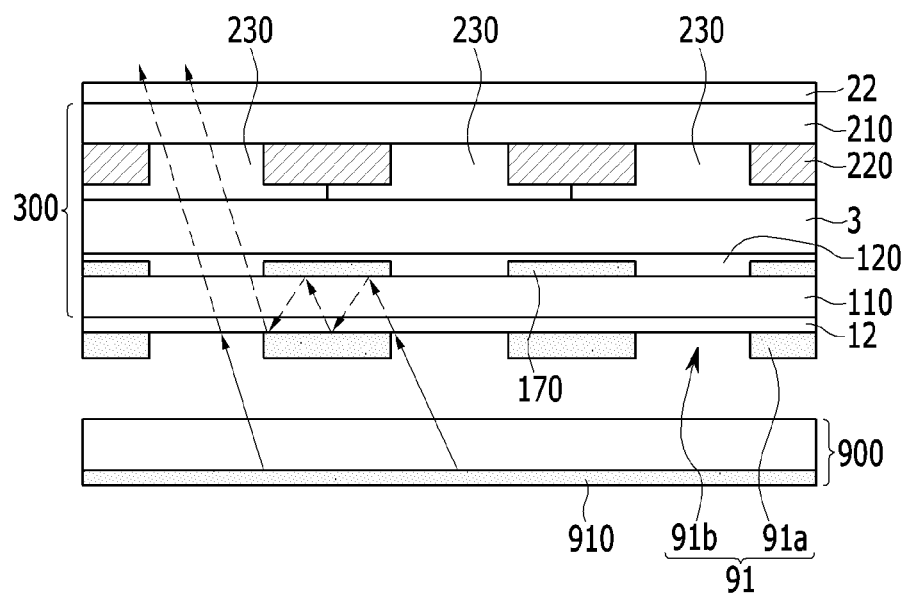
Figure 10:
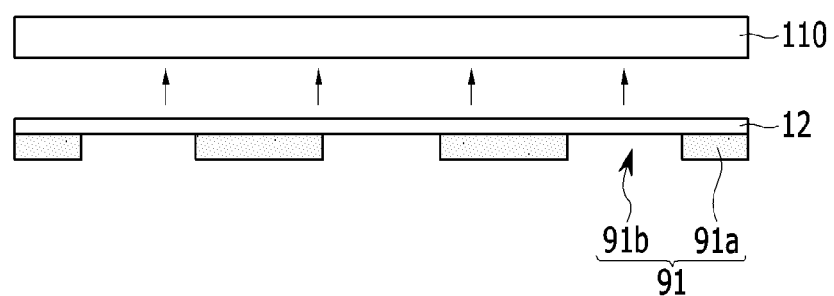
Figure 11:
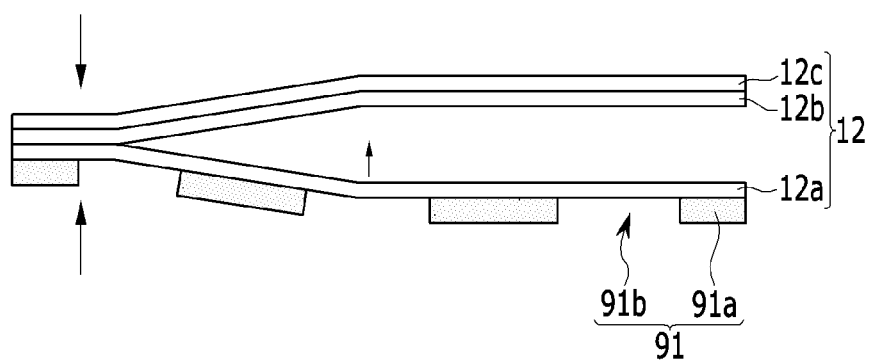
Figure 12:
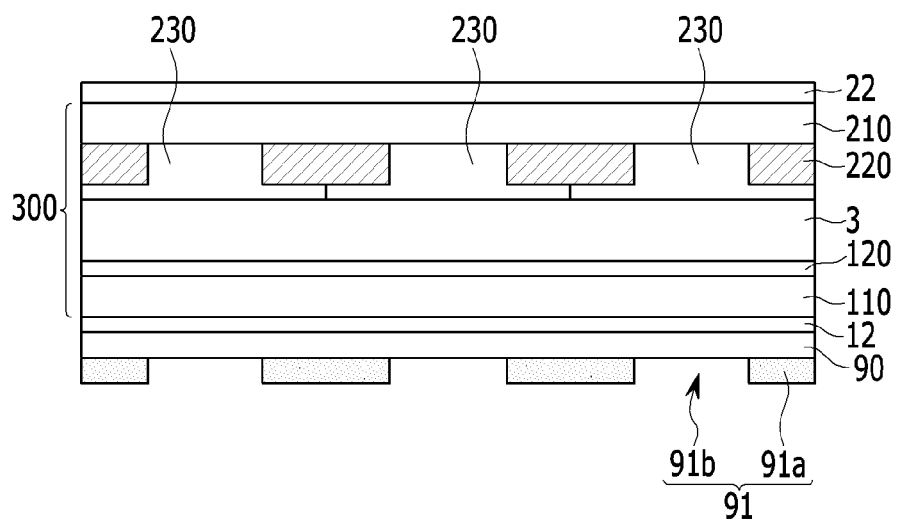
Figure 13:
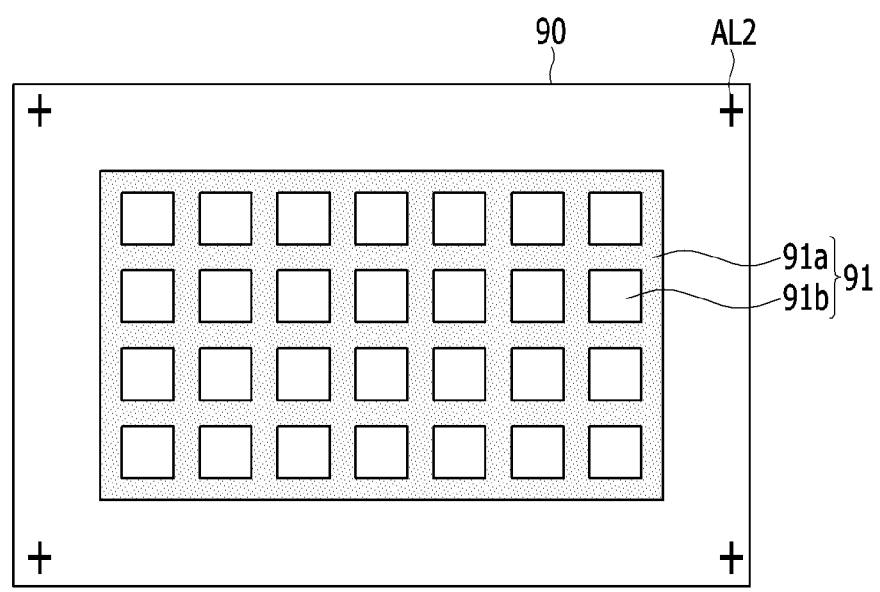
Figure 14:
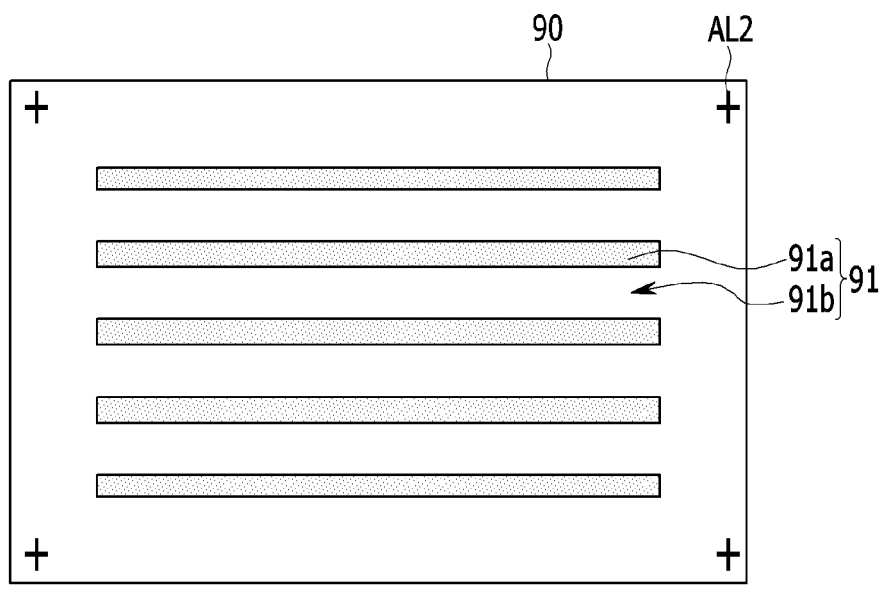
Figure 15:
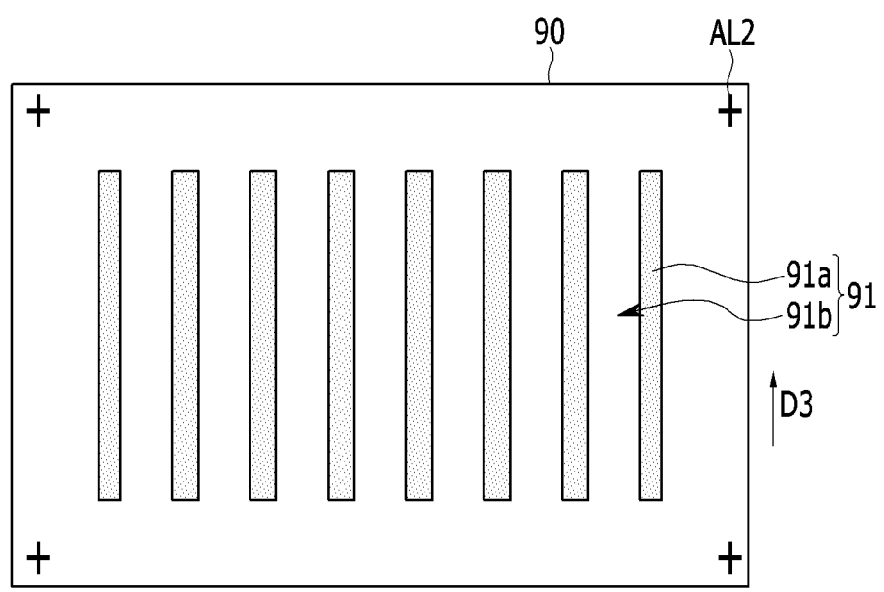
Figure 16:
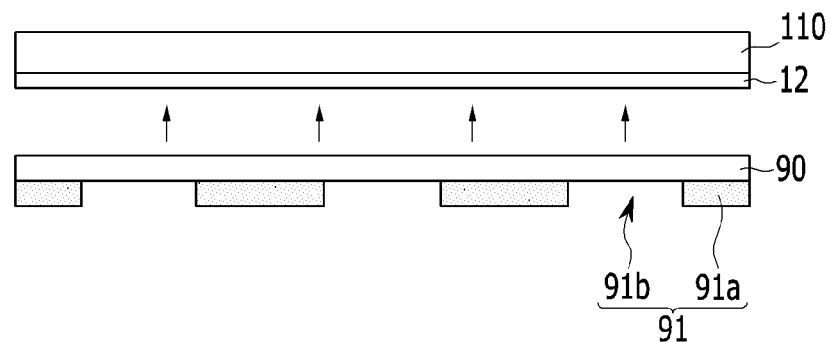
Figure 17:
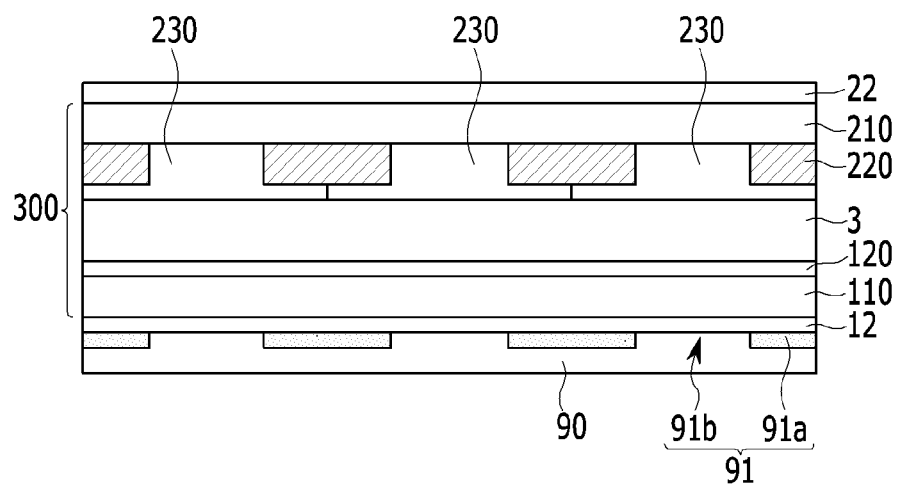
Figure 18:
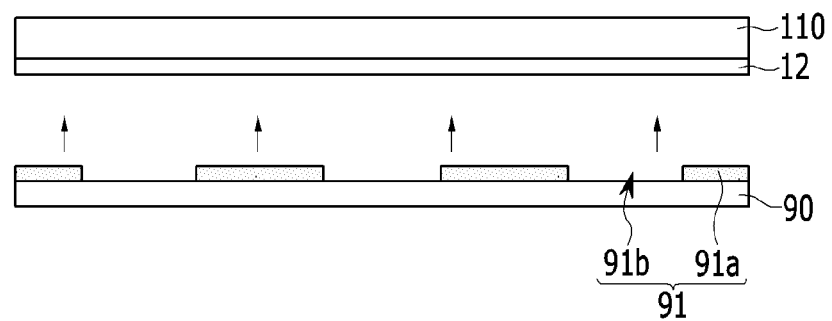
Figure 19:
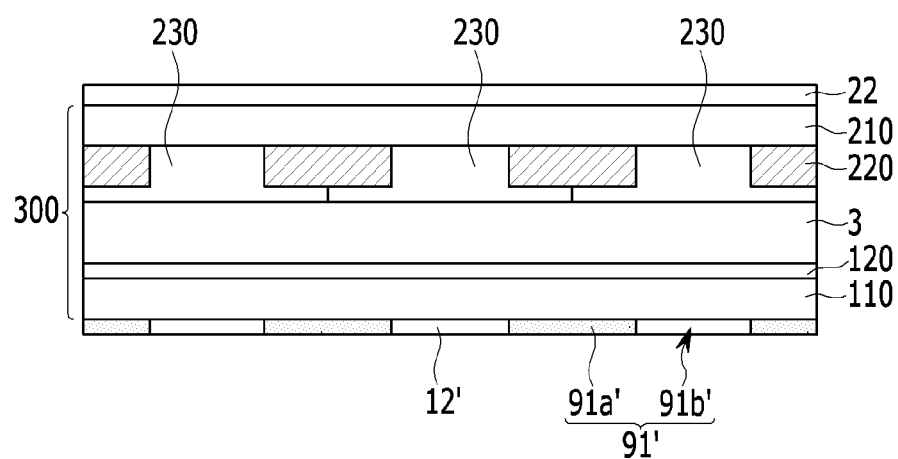

FIG. 2 is a top plan layout view of a display panel which may be used in combination with the cross sectional view of FIG. 1, where the cross section is taken along line I-I, FIG. 3, FIG. 4, and FIG. 5 are respective top plan views of various reflection patterns that may be used in display devices according to the present disclosure of invention, FIG. 6 and FIG. 7 are respective cross-sectional views of backlight units that may be used in display devices according to the present disclosure, FIG. 8 and FIG. 9 are respective cross-sectional views of display devices according to the present disclosure, FIG. 10 is a cross-sectional view showing a process of attaching a polarizer including a reflection pattern to a display panel in accordance with the present disclosure of invention, FIG. 11 is a cross-sectional view showing a process of manufacturing a polarizer including a reflection pattern for a display device in accordance with the present disclosure of invention, FIG. 12 is a cross-sectional view of a display device according to an exemplary embodiment, FIG. 13, FIG. 14, and FIG. 15 are top plan views of a reflection pattern film according to an exemplary embodiment, FIG. 16 is a cross-sectional view showing a process of attaching a reflection pattern film to a display panel of a display device according to the present teachings, FIG. 17 is a cross-sectional view of a display device according to an exemplary embodiment, FIG. 18 is a cross-sectional view showing a process of attaching a reflection pattern film to a display panel in accordance with the present disclosure of invention, and FIG. 19 is a cross-sectional view of a display device according to an exemplary embodiment.

DETAILED DESCRIPTION

The present disclosure of invention will be provided more fully hereinafter with reference to the accompanying drawings, in which exemplary embodiments are shown. As those skilled in the art would realize after appreciating this disclosure, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Firstly, a display device according to an exemplary first embodiment will be described with reference to FIG. 1 to FIG. 7.

FIG. 1 is a cross-sectional view of a display device according to an exemplary embodiment that is further shown in FIG. 2 where the cross section is taken along the line I-I of FIG. 2 and where FIG. 2 is a top plan layout view of the exemplary display panel. FIG. 3, FIG. 4, and FIG. 5 are respective top plan views of various reflection patterns that may be alternatively be used. FIG. 6 and FIG. 7 are cross-sectional views of backlight units that may be included in a display device according to an exemplary embodiment of FIGS. 1-2.

Referring to FIG. 1, a display device according to an exemplary embodiment includes an externally illuminated display panel 300 (e.g., a transmissive LCD panel), a backlight unit 900, and a reflection pattern 91 interposed between the display panel 300 and the backlight unit 900 where the reflection pattern 91 is aligned to and matched to transmissive and blocking areas of the overlying display panel 300.

Referring to both of FIG. 1 and FIG. 2, the display panel 300 includes a display area DA within which a plurality of pixel units PX are provided with respective light-passing and light controlling sub-areas (aperture areas) where the plurality of pixel units PX collectively function as a unit for displaying a desired image. Between the light controlling sub-areas (aperture areas) of the pixel units PX there are provided a plurality of signal lines configured for transmitting control and driving signals to the pixel units. A non-displaying peripheral area PA is formed around the display area (DA). The plurality of pixel units PX may be arranged in a matrix format having rows and columns. The display panel 300 may be any actively externally illuminated display panel such as for example, but not limited to, a transmissive liquid crystal display, an electric-field displaced liquid dye type display and an electrophoretic display. Among surfaces of the display panel 300, a surface of a side facing the backlight unit 900 is referred to as a major lower surface and the opposite surface is referred as a major upper surface. The upper surface and the lower surface of the display panel 300 may be parallel to a first direction D1 of a here-used reference frame and also parallel to its second direction D2. Likewise, upper surfaces and upper sides of other constituent elements mean surfaces of the same orientation as the major upper surface of the display panel 300.

The display area DA includes controlled light transmitting regions TA through which light is controllably transmitted and light blocking regions BA through which the light is not transmitted.

The transmitting regions TA may correspond to the aperture areas of the pixel units PX, and may have the same matrix format.

The light blocking regions BA are remaining regions; except for the light transmitting regions TA, of the display area DA. The light blocking regions BA each include a transverse part mainly extending in a horizontal direction of FIG. 1 and a longitudinal part mainly extending in a vertical direction (D3) of FIG. 1. A width W1 of the light blocking region BA may be in a range of several microns (μm) to several tens of microns, but is not limited thereto. The light blocking region BA may separately include a light blocking member (not shown) or an opaque conductor, for example, a conductor such as one including an opaque metal.

The peripheral area PA may include a plurality of driving circuits configured for applying respective driving signals to the plurality of signal lines of the display area DA. Also, in the peripheral area PA, an alignment key (indicia) AL1 may be formed to align different layers in a manufacturing process of the display device including the display panel 300.

A lower polarizer layer 12 is provided for providing a predetermined polarization state to light passed through (once passed through) the lower polarizer layer 12 and then made incident upon the major lower surface of the display panel 300. The lower polarizer layer 12 may be affixed to the lower surface of the display panel 300.

The reflection pattern 91 is provided below the lower polarizer layer 12 such that backlight-sourced light which is once reflected from the reflection pattern 91 is not pre-processed by the lower polarizer layer 12. The reflection pattern 91 includes a plurality of reflection parts 91a configured for reflecting light incident to the bottom or lower surface of the reflection pattern 91 and a plurality of light-passing portions (e.g., openings) 91b disposed where the reflection parts 91a are not disposed.

The reflection parts 91a of the reflection pattern 91 may include a reflective material, for example, a reflective metal. Reflection may occur at either an upper surface or a lower surface of the reflection part 91a.

Referring to FIG. 1, the reflection part 91a of the reflection pattern 91 is positioned at a region overlapping the light blocking region BA of the display panel 300. Accordingly, the light-passing opening 91b of the reflection pattern 91 corresponds to the transmitting region TA of the display panel 300.

As shown in FIG. 3, the reflection pattern 91 may have the reflection part 91a of a plane shape corresponding to the light blocking region BA of the display panel 300. That is, the reflection pattern 91 may have a mesh shape including the plurality of openings 91b arranged in an approximate matrix, and may include a transverse part extending mainly in a horizontal direction and a longitudinal part extending mainly in a vertical direction of FIG. 3.

As shown in FIG. 4, the reflection pattern 91 according to another exemplary embodiment does not have to fully match the pattern of the transmitting regions TA and the light blocking regions BA of the overlapped display panel and may instead have the reflection part 91a of a shape corresponding to the transverse part of the light blocking region BA of the display panel 300. That is, the reflection part 91a of the reflection pattern 91 may include a plurality of transverse parts arranged in one line in the vertical direction, and an extending direction of each transverse may be the first direction D1.

According to another exemplary embodiment of the present disclosure, as shown in FIG. 5, the reflection pattern 91 may include the reflection part 91a of a shape corresponding to the light blocking region BA of the display panel 300. That is, the reflection part 91a of the reflection pattern 91 may include a plurality of longitudinal parts arranged in one line in the horizontal direction, and an extending direction of each longitudinal part may be the second direction D2.

In the exemplary embodiments shown in FIG. 1 to FIG. 5, a pitch or period of the transverse part or the longitudinal part of the reflection pattern 91 is the same as a corresponding pitch or period of the respective transverse part or the respective longitudinal part of the light blocking region BA, but is not limited thereto. That is, the repetition period of at least one of the transverse part or the longitudinal part of the reflection pattern 91 may be larger (e.g., an integer multiple of) the period of the respective transverse part or the respective longitudinal part of the light blocking region BA.

The width W2 of the transverse part or the longitudinal part of the reflection part 91a of the reflection pattern 91 may be substantially equal to (the same as) or slightly smaller than the width W1 of the respective transverse part or the respective longitudinal part of the light blocking region BA of the display panel 300, while facing and overlapping it. That is, the opening 91b of the reflection pattern 91 may have substantially the same opening area or opening width as the corresponding transmitting region TA of the display panel 300, and may have a wider opening area or opening width than the corresponding transmitting region TA.

When the lower polarizer 12 is attached to the lower surface of the display panel 300, the reflection pattern 91 may be attached to the lower surface of the lower polarizer 12.

Referring to FIG. 1, the backlight unit 900 is positioned at the rear surface of the display panel 300 and may irradiate light to the display panel 300. The backlight unit 900 includes a reflection surface 910 configured for reflecting the light generated from the backlight unit 900 and the light that is again incident to the backlight unit 900 upward. Here, "upward" means the third direction D3 perpendicular to the first direction D1 and to the second direction D2. The reflection surface 910 may be a reflection sheet including a reflective material, and may have a mirrored surface.

When the light emitted from the backlight unit 900 is passed through the opening 91b of the reflection pattern 91, the light is passed through the transmitting region TA of the display panel 300 and may then be recognized by a user as part of a desired image formed from selectively controlled light. However, the light incident to the lower surface of the reflection pattern 91 is reflected (before it gets to the polarizer layer 12) and is again incident to the backlight unit 900. The light re-incident to the backlight unit 900 is reflected by the reflection surface 910 and is passed through the opening 91b of the reflection pattern 91 upward or is reflected by the lower surface of the reflection part 91a of the reflection pattern 91. As described above, the light reciprocating between the lower surface of the reflection pattern 91 and the reflection surface 910 of the backlight unit 900 may be resultantly emitted to the side of the user through the opening 91b of the reflection pattern 91 and the transmitting region TA of the display panel 300. This is referred to as light recycling.

As described above, according to an exemplary embodiment of the present disclosure of invention, at least part (if not substantially all) of the light that is incident to the light blocking region BA of the display panel 300 to be absorbed or to be scattered is instead reflected by the reflection part 91a of the reflection pattern 91 positioned at the lower surface of the display panel 300 (below the polarizer 12 and/or below other optical processing sheets (not shown) such as prismatic sheets), thereby resultantly increasing the ratio at which backlighting sourced light is eventually emitted through the transmitting region TA of the display panel 300 and increasing the light efficiency of the display device.

Particularly, when the display panel 300 includes the lower polarizer 12, if the light passing through the lower polarizer 12 is reflected toward the backlight unit 900, the polarization state of the light while passing through the backlight unit 900 may be changed, and in the process in which the light having the changed polarization passes through the lower polarizer 12, the light recycling efficiency is very much decreased. However, according to an exemplary embodiment of the present disclosure, the reflection pattern 91 is positioned at the lower surface of the lower polarizer 12 (or optionally at the lower surface of lower optical processing sheets if also present) so as to reflect the light directed to the blocking region BA before is changed by the polarizing layer 12 such that the light reciprocating between the reflection pattern 91 and the reflection surface 910 of the backlight unit 900 is not affected by the polarizing layer 12. Accordingly, the reciprocated light may have increased transmittance as compared to that first passed through the lower polarizer 12, thereby increasing the light efficiency.

The light re-cycle efficiency, that is, the improvement degree of the light efficiency of the reciprocation of the light between the reflection pattern 91 and the reflection surface 910 of the backlight unit 900, may be increased when the transmitting region TA of the display panel 300 constitutes a smaller portion of the display area DA. Particularly, in a case of a high resolution display panel 300, a region occupied by the signal line is increased such that the light blocking region BA may become wider, and in this case, the light efficiency may be increased by using the reflection pattern 91 of the present disclosure so as to recycle light incident on the blocking region BA. For example, when the aperture ratio of the display panel 300 is about 15%, a luminance improvement of about 200% to 400% may be expected compared to a case when the reflection pattern 91 is not provided.

Referring to FIG. 6, the backlight unit 900 according to an exemplary embodiment may include an edge-illuminating light source 950 and a light guide 920 (e.g., a light guide plate or LGP).

The light source 950 may have a shape of a light source package, and includes at least one light emitting element. An example of the light emitting element may be a light emitting diode (LED), but it is not limited thereto.

The light source 950 may be disposed to be close to the side surface of the light guide 920, and in this case, an edge type of backlight unit 900 is provided.

The light guide 920 redirects and guides the light emitted from the light source 950 to be incident upon the major lower surface f the display panel 300. The bottom surface of the light guide 920 may include a reflection surface 910 configured for reflecting the incident light to the side of the front surface to be progressed from the light guide 920. Alternatively or additionally, the light guide 920 may operate on the basis of refractive, total internal reflection of light. Alternatively or additionally, the reflection means may be disposed to the left of the illustrated light source 950.

A diffuser (not shown) and a plurality of other optical sheets (not shown) may be positioned on the light guide 920. The diffuser 930 may uniformly diffuse light emitted from the light guide 920 to improve uniformity of luminance of light. The optical sheet may include a prism sheet (not shown).

Referring to FIG. 7, the backlight unit 900 according to the illustrated exemplary embodiment is substantially the same as most of the backlight unit 900 according to FIG. 6, however in this case; a direct backlighting type of backlight unit 900 is provided. The backlight unit 900 according to the present exemplary embodiment includes at least one light source 950 disposed inside the backlighting unit 900, and the light source 950 operates as a direct type of light source that directly emits is light to the major lower surface of the display panel 300. Also, the backlight unit 900 according to the present exemplary embodiment does not include the light guide, but includes a diffuser 940 positioned on the light source 950. The diffuser 940 improves the luminance uniformity of the light emitted from the light source 950. In this case, the reflection pattern 91 (not shown in FIG. 7) is interposed between the diffuser 940 and the polarizer 12.

The backlight unit 900 according to the exemplary embodiment shown in FIG. 7 may include a reflection surface 910 positioned under the light source 950. The reflection surface 910 may be positioned on a lower receiver case (not shown) receiving the light source 950.

FIG. 8 is a cross-sectional view of a display device according to an exemplary embodiment.

Referring to FIG. 8, the display device according to an exemplary embodiment of the present disclosure as the liquid crystal display includes a display panel 300, a lower polarizer 12 attached to the lower surface of the display panel 300, an upper polarizer 22 attached to an upper surface of the display panel 300, a reflection pattern layer 91 disposed below the lower polarizer 12, and a backlight unit 900 disposed below the reflection pattern layer 91.

The display panel 300 includes a lower substrate 110 and an upper substrate 210 spaced apart and facing each other, and a liquid crystal layer 3 interposed therebetween.

At least one pattern layer 120 is included on the lower substrate 110. The pattern layer 120 may include at least one insulating layer and at least one conductive layer.

A patterned light blocking member 220 and a plurality of different colored color filters 230 are positioned on the lower surface of the upper substrate 210.

The light blocking member 220 is composed of a material preventing light leakage and it has a plurality of openings (apertures) for letting light through. The blocking regions of the light blocking member 220 correspond to the previously described light blocking regions BA, and the openings of the light blocking member 220 correspond to the previously described transmitting regions TA. Most of the color filter 230 may exist in the region enclosed by the light blocking member 220. Each color filter 230 may display one of primary colors such as three primary colors of red, green, and blue. It is within the contemplation of the disclosure to alternatively use multi-primary and/or white/clear color filters as well such as RGBWCY repeat groups.

At least one of the color filter 230 and the light blocking member 220 may be positioned on the lower substrate 110 rather than on the upper one.

The liquid crystal layer 3 may include liquid crystal molecules 31 having dielectric anisotropy.

The lower polarizer 12 is provided on the lower surface of the lower substrate 110, that is, on the outer surface of the lower substrate 110, and the upper polarizer 22 is provided on the upper surface of the upper substrate 210, that is, on the outer surface of the upper substrate 210. The polarization of the light passed through the lower polarizer 12 is further changed according to the orientation of the liquid crystal molecules 31 of the liquid crystal layer 3, and the change of the polarization represents a selective transmittance change that dictates how the light is next passed upwardly through the upper polarizer 22 for subsequent viewing by a user (not shown).

The reflection pattern layer 91 is positioned on the lower surface of the lower polarizer 12. The reflection pattern 91 is positioned at the region overlapping the light blocking member 220. Accordingly, the openings 91b of the reflection pattern 91 correspond to the openings of the light blocking member 220 of the display panel 300. The width W2 of the reflection part 91a of the reflection pattern 91 is substantially the same as or smaller than the width W1 of the corresponding light blocking member 220.

According to the present exemplary embodiment, the reflection pattern 91 positioned on the lower surface of the lower polarizer 12 reflects the light before the polarization of such light by the lower polarizer 12 so that the light is reciprocated for reuse between the reflection pattern 91 and the reflection surface 910 of the backlight unit 900 for example as non-polarized light. Accordingly, when the reciprocating light ultimately passes through an opening in the reflection pattern 91 and then becomes incident upon the lower polarizer 12, it will be substantially more likely that a greater portion of the ultimately passing through light will also pass through the lower polarizer 12 and thus the transmittance may be increased, thereby increasing light efficiency.

The description of the reflection pattern 91, the description of the backlight unit 900, and the light efficiency improvement effect are the same as in the previously described exemplary embodiment such that detailed descriptions thereof are omitted.

A detailed structure of the display device according to an exemplary embodiment of the present disclosure will be described with reference to FIG. 9 as well as the described drawings.

FIG. 9 is a cross-sectional view of a display device according to another exemplary embodiment.

Referring to FIG. 9, the display device according to the illustrated exemplary embodiment is substantially the same as most of the exemplary embodiment shown in FIG. 8, except for a reflective pattern layer 120 formed on the lower substrate 110 and including reflective members 170. Among the surfaces of the reflective layer 170, the lower surface may particularly include the reflection surface. In general, the reflective layer members 170 may include the conductive wiring layer members having for example reflective metals at their bottoms. For example, the reflective layer members 170 may be the signal lines used for transmitting the driving signals and may be made of a single layer of metal such as copper (Cu), or a multilayer including Cu and/or other reflective metals as their bottom conductive portions.

The reflective layer members 170 may be mainly opaque and may be covered by corresponding ones of the light blocking regions BA. That is, the reflective layer members 170 may be positioned at the regions covered by the corresponding light blocking members 220.

According to the present exemplary embodiment, among the light incident to the display panel 300 through the opening 91b of the reflection pattern 91, the light incident to the lower surface of the reflective layer members 170 of the pattern layer 120 may be reflected downward. Most of the light reflected by the lower surface of the reflective layer 170 is again reflected back up by the spaced apart upper surface of the reflection part 91a of the reflection pattern 91 such that the light may be reciprocated between the reflective layer 170 and the reflection pattern 91. The reciprocating light may be resultantly emitted outside through the transmitting region TA of the display panel 300.

As described above, according to an exemplary embodiment therefore, in addition to reuse of light due to light recycling between the reflection pattern 91 and the reflection surface 910 of the backlight unit 900, the light recycling between the reflection pattern 91 and the reflective layer 170 in the display panel 300 may also be used, thereby further improving light use efficiency.

Next, a manufacturing method of a display device according to an exemplary embodiment will be described with reference to FIG. 10 and FIG. 11 as well as FIG. 8 and FIG. 9.

FIG. 10 is a cross-sectional view showing a process of attaching a polarizer layer 12 having a reflection pattern 91 pre-disposed thereon, to a display panel of a display device according to an exemplary embodiment. FIG. 11 is a cross-sectional view showing a process of manufacturing a polarizer including a reflection pattern of a display device according to an exemplary embodiment.

A manufacturing method of a display device according to the present disclosure of invention is not limited to this one method however. Here, a partial manufacturing process, a process of simultaneously attaching the lower polarizer 12 and the reflection pattern 91 to the lower substrate 110, will be described in detail with reference to accompanying drawings.

According to an exemplary embodiment of the present invention, the lower polarizer 12 is firstly manufactured and then a reflection pattern 91 is formed on the lower surface of the lower polarizer 12. The reflection pattern 91 may be formed by coating and patterning a reflective material such as copper, aluminum, etc., on the lower surface of the lower polarizer 12.

According to another exemplary embodiment, as shown in FIG. 11, in the manufacturing process of the lower polarizer 12, the reflection pattern 91 may be adhered as an additional layer 21a to other formed layers (12b, 12c) of the lower polarizer 12.

In other words, the lower polarizer 12 may include lower and upper protection films (e.g., scratch protections films) 12a and 12c and a polarization film 12b interposed therebetween. The lower and upper protection films 12a and 12c may include a TAC (tri acetate cellulose) film, and the polarization film 12b may include a polymer film such as PVA (polyvinyl alcohol). In this case, after the reflection pattern 91 is firstly formed on the lower protection film 12a, the lower protection film 12a, the upper protection film 12c, and the polarization film 12b are combined (e.g., adhered to one another) to manufacture the lower polarizer 12.

Again referring to FIG. 10, the lower polarizer 12 including the reflection pattern 91 is attached on the lower surface of the lower substrate 110. At this time, alignment keys (e.g., indicia, marks, etc.) of the lower polarizer 12 and the lower substrate 110 may be used to align the layers with one another.

According to an exemplary embodiment, the lower polarizer 12 including the reflection pattern 91 is attached to a holder (support, not shown) to be held flat thereby and the alignment key is recognized through a camera or other appropriate means so as to align the lower polarizer 12 relative to counterpart alignment keys (e.g., indicia, marks, etc.) of the lower substrate 110 prior to adhesion to the lower surface of the lower substrate 110. When the reflection part 91a of the reflection pattern 91 includes the transverse part and the longitudinal part as shown in FIG. 3, alignment both in the horizontal direction and the vertical direction is required. Next, after alignment is achieved and in one embodiment, the lower polarizer 12 is combined and pressed vertically to the lower surface of the lower substrate 110 to thereby attach the lower polarizer 12 to the lower surface of the lower substrate 110.

According to another exemplary embodiment, the lower polarizer 12 including the reflection pattern 91 may be attached on the lower surface of the lower substrate 110 through a lamination method. However, the alignment in a lamination direction as a direction that a pressing roller is progressed is not necessary, and the alignment of the direction perpendicular to the lamination direction is necessary. In this case, the reflection part 91a of the reflection pattern 91 may have the stripe shape like the exemplary embodiment shown in FIG. 4 or FIG. 5. The extending direction of the reflection part 91a of the reflection pattern 91 may almost accord with the lamination direction.

A detailed structure of the display device according to another exemplary embodiment will now be described with reference to FIG. 12 to FIG. 15 as well as FIG. 1 to FIG. 7.

FIG. 12 is a cross-sectional view of a display device according to an exemplary embodiment, and FIG. 13, FIG. 14, and FIG. 15 are possible top plan views of a reflection pattern film according to the now described exemplary embodiment.

Referring to FIG. 12, the display device according to the exemplary embodiment is substantially the same as most of the display device according to the exemplary embodiment shown in FIG. 8 or FIG. 9, except for a lower film 90 further positioned between the reflection pattern 91 and the lower polarizer 12.

The lower film 90 may be a transparent flexible plastic film. The lower film 90 may or may not have birefringence. For example, the lower film 90 may include a TAC or COP film without birefringence, or a PET or a PEN film with birefringence. FIG. 12 shows an example in which the surface where the reflection pattern 91 is not formed among the surfaces of the lower film 90 is attached to the lower polarizer 12 when the lower film 90 does not have birefringence. When the interior of the display panel 300 includes the reflective layer 170 as shown in FIG. 9, the light reciprocating between the upper surface of the reflection pattern 91 and the reflective layer 170 is passed through the lower polarizer 12, and if the lower film 90 has birefringence, the light recycling effect may be decreased by the change of the polarization state. However, like the present exemplary embodiment, if the lower film 90 does not have birefringence, the light recycling effect may be further increased.

Referring to FIG. 13, the reflection pattern 91 according to an exemplary embodiment is formed on the surface of the lower film 90 (e.g., one without birefringence) and may have a plane shape corresponding to the light blocking region BA of the display panel 300, as shown in FIG. 3. That is, the reflection pattern 91 may have the mesh shape including a plurality of openings 91b arranged substantially in the matrix form, thereby having the transverse part extending substantially in the horizontal direction and the longitudinal part extending substantially in the vertical direction.

Referring to FIG. 14, the reflection pattern 91 according to another exemplary embodiment of the present invention is formed on the surface of the lower film 90, and as shown in FIG. 4, it may have the shape corresponding to the transverse part of the light blocking region BA of the display panel 300. That is, the reflection part 91a of the reflection pattern 91 may include a plurality of transverse parts arranged in one line in the vertical direction.

Referring to FIG. 15, the reflection pattern 91 according to another exemplary embodiment of the present invention is formed on the surface of the lower film 90, and as shown in FIG. 5, it may have the shape corresponding to the longitudinal part of the light blocking region BA of the display panel 300. That is, the reflection part 91a of the reflection pattern 91 may include a plurality of longitudinal parts arranged in the horizontal direction in one line.

As shown in FIG. 13 to FIG. 15, one or more appropriate alignment keys AL2 may be positioned in the peripheral area of the lower film 90 for use in aligning the reflection pattern 19 to its support film 90 and then aligning the support film 90 to other parts of the display device.

Also, many characteristics and effects of the exemplary embodiments shown in FIG. 1 to FIG. 7 may be applied to the present exemplary embodiment.

Next, a manufacturing method of a display device according to an exemplary embodiment will be descried with reference to FIG. 16 along with FIG. 12 to FIG. 15.

FIG. 16 is a cross-sectional view showing a process of attaching a reflection pattern film to a display panel of a display device according to an exemplary embodiment.

A manufacturing method of a display device according to an exemplary embodiment of the present disclosure of invention is not limited to this however. Here, a partial manufacturing process, a process of attaching the lower film 90 including the reflection pattern 91 to the lower surface of the lower polarizer 12, will be described in detail with reference to the accompanying drawings.

According to an exemplary embodiment, the reflection pattern 91 is formed on the lower support film 90. At this time, the reflection pattern 91 (including alignment keys) may be formed by a photolithography process on the lower film 90 in a roll state. Next, an adhesive is coated on a surface of the lower film 90 for example on the surface where the reflection pattern 91 is not positioned and the lower film 90 is cut, and then the lower film 90 including the reflection pattern 91 is attached to the lower surface of the lower polarizer 12.

When attaching the lower film 90 including the reflection pattern 91 on the lower surface of the lower polarizer 12, the alignment key(s) of the lower film 90 and the display panel 300 may be used.

According to an exemplary embodiment, the lower polarizer 12 is firstly attached on the lower surface of the lower substrate 110. Next, the lower film 90 including the reflection pattern 91 is attached to a supporting holder (not shown) so as to be held flat and the alignment key(s) is/are recognized through a camera or equivalent means and used to align the lower film 90 on the lower surface of the lower substrate 110. When the reflection part 91a of the reflection pattern 91 includes the transverse part and the longitudinal part as shown in FIG. 3, alignment in the horizontal direction and the vertical direction is required. Next, the lower film 90 is combined and pressed vertically to the lower surface of the lower polarizer 12 to thereby attach the lower film 90 to the lower surface of the lower polarizer 12.

According to another exemplary embodiment, the lower film 90 including the reflection pattern 91 may be attached on the lower surface of the lower polarizer 12 through a lamination method. However, the alignment in a lamination direction as a direction in which a pressing roller is progressed is not necessary, and the alignment of the direction perpendicular to the lamination direction is necessary. In this case, the reflection part 91*a* of the reflection pattern 91 may have the striped shape like the exemplary embodiment shown in FIG. 4 or FIG. 5. The extending direction of the reflection part 91*a* of the reflection pattern 91 may almost accord with the lamination adhesion line direction.

Next, referring to FIG. 17, a detailed structure of the display device according to another exemplary embodiment will be described.

FIG. 17 is a cross-sectional view of a display device according to yet a further exemplary embodiment of the present disclosure of invention, Referring to FIG. 17, the display device according to the exemplary embodiment is substantially the same as most of the display device according to the exemplary embodiment shown in FIG. 12 to FIG. 15, except for a position of the reflection pattern 91 and the lower film 90. That is, the reflection pattern 91 may be positioned between the lower film 90 and the lower polarizer 12.

Particularly, according to the present exemplary embodiment, the lower film 90 may have birefringence. The display panel 300 includes the reflective layer 170 as shown in FIG. 9, and when the lower film 90 has birefringence, if the light passing through the lower polarizer 12 reciprocates between the upper surface of the reflection pattern 91 and the reflective layer 170 and is passed through the lower film 90 having birefringence, the light recycling effect may be decreased by the change of the polarization state. However, like the present exemplary embodiment, by positioning the lower film 90 having birefringence under the reflection pattern 91, the decrease of the light recycling effect between the reflection pattern 91 and the reflective layer 170 in the display panel 300 may be prevented or reduced.

The many characteristics and effects of the several exemplary embodiments may be equally applied to the present exemplary embodiment.

Next, a manufacturing method of a display device according to an exemplary embodiment of the present disclosure will be described with reference to FIG. 18 as well as FIG. 17.

FIG. 18 is a cross-sectional view showing a process of attaching a reflection pattern film to a display panel of a display device according to an exemplary embodiment of the present disclosure.

The manufacturing method of the display device according to an exemplary embodiment is substantially the same as most of the previous exemplary embodiments, and particularly, most of the exemplary embodiment shown in FIG. 16, however when attaching the lower film 90 including the reflection pattern 91 to the lower surface of the lower polarizer 12, the surface formed with the reflection pattern 91 meets the lower polarizer 12.

Next, a detailed structure of the display device according to an exemplary embodiment of the present disclosure will be described with reference to FIG. 19.

FIG. 19 is a cross-sectional view of a display device according to an exemplary embodiment.

Referring to FIG. 19, the display device according to an exemplary embodiment is substantially the same as most of the previous several exemplary embodiments such that differences will be described.

According to the present exemplary embodiment, a reflection pattern 91' and a plurality of lower polarizer pieces 12' are positioned at the lower surface of the lower substrate 110.

The reflection pattern 91' may have the same structure as the reflection pattern 91 according to the previous several exemplary embodiments, however it may be monolithically integrally formed on the lower surface of the lower substrate 110. The reflection pattern 91' may be formed by coating and patterning a reflective material such as the metal directly on the lower substrate 110 by the photolithography process.

The reflection pattern 91' includes a reflection part 91*a*' and an opening 91*b*', and the reflection part 91*a*' may have the mesh shape or the stripe shape like the previous exemplary embodiments, however the shape is not limited thereto.

The lower polarizer pieces 12' have the same function as the lower polarizer 12 of the previous exemplary embodiment, however they are not positioned on the entire surface of the lower substrate 110 and may be positioned in the opening 91*b*' of the reflection pattern 91'. Accordingly, the lower polarizer pieces 12' and the reflection part 91*a*' of the reflection pattern 91' are alternately disposed according to any one direction, and may not be overlapped with each other. A passivation layer (not shown) may be further positioned on the reflection pattern 91' after the latter is patterned.

Differently from FIG. 19, the reflection pattern 91' and the lower polarizer pieces 12' may be formed on a separate lower film to be attached. At this time, the lower film may be positioned on or under the reflection pattern 91' and the lower polarizer pieces 12'.

According to the present exemplary embodiment, when the light reciprocates between the reflection pattern 91' and the reflective layer (not shown) inside the display panel 300, the light is not passed through the polarizer such that the light efficiency may be further increased.

While this disclosure of invention has been described in connection with what is presently considered to be practical exemplary embodiments, it is to be understood that the present teachings are not limited to the disclosed embodiments, but, on the contrary, they are intended to cover various modifications and equivalent arrangements included within the spirit and scope of the present teachings.

What is claimed is:

1. A display device comprising:
    a display panel including a plurality of selective light transmitting regions through which light can be controllably transmitted for viewing by a forward disposed user of the display device and one or more light blocking regions through which light is not transmitted forward for viewing by the user;
    a backlighting unit disposed and configured to supply backlighting light to the display panel, the backlighting unit including a light returning mechanism that is configured to return forward and toward the display panel, light received in a backward heading direction from the display panel; and
    a reflection pattern layer disposed between the display panel and the backlighting unit and including a plurality of light-passing regions configured to let light pass therethrough and one or more reflection portions configured to reflect light;
    wherein the one or more reflection portions, overlapping the light blocking regions, and are disposed to intercept, and reflect backwards, light coming from the backlighting unit and heading forward to a corresponding one or more of the light blocking regions of the display panel, and
    wherein the plurality of light-passing regions are disposed to let therethrough light coming from the backlighting unit and heading forward toward a corresponding one of the selective light transmitting regions of the display panel.

2. The display device of claim 1, further comprising
    a backlighting light changing layer configured to change one or more optical characteristics of light passed therethrough, the backlighting light changing layer being interposed between the display panel and the backlighting unit, the backlighting light changing layer including a polarizer configured to change a polarization characteristic of light passed therethrough.

3. The display device of claim 2, further comprising a lower film on which the reflection pattern layer is formed.

4. The display device of claim 3, wherein the lower film has birefringence.

5. The display device of claim 4, wherein the reflection pattern layer is positioned between the lower film and the display panel.

6. The display device of claim 5, wherein a width of a reflection part of the reflection pattern layer that intercepts light headed toward a corresponding light blocking region is less than a width of the corresponding light blocking region.

7. The display device of claim 6, wherein the light returning mechanism of the backlighting unit includes a reflection surface disposed to reflect light toward the display panel.

8. The display device of claim 7, wherein the display panel includes a reflective layer configured to reflect light backward and toward the reflection pattern layer.

9. The display device of claim 3, wherein the lower film does not have birefringence.

10. The display device of claim 9, wherein the lower film is positioned between the reflection pattern layer and the display panel.

11. The display device of claim 10, wherein a width of a reflection part of the reflection pattern layer that intercepts light headed toward a corresponding light blocking region is less than a width of the corresponding light blocking region.

12. The display device of claim 11, wherein the light returning mechanism of the backlighting unit includes a reflection surface disposed to reflect light toward the display panel.

13. The display device of claim 12, wherein the display panel includes a reflective layer configured to reflect light backward and toward the reflection pattern layer.

14. The display device of claim 2, wherein a width of a reflection part of the reflection pattern layer that intercepts light headed toward a corresponding light blocking region is less than a width of the corresponding light blocking region.

15. The display device of claim 14, wherein the light returning mechanism of the backlighting unit includes a reflection surface disposed to reflect light toward the display panel.

16. The display device of claim 15, wherein the display panel includes a reflective layer configured to reflect light backward and toward the reflection pattern layer.

17. The display device of claim 16, wherein the plurality of light-passing regions of the reflection pattern layer are arranged in a matrix format.

18. The display device of claim 16, wherein the one or more reflection portions of the of the reflection pattern layer are arranged as a series of spaced apart stripes.

19. The display device of claim 1, wherein the backlighting light changing layer comprises a plurality of polarizer pieces that are coplanar with the reflection pattern layer such that the polarizer pieces are positioned in the light-passing regions of the reflection pattern layer.

20. The display device of claim 19, wherein the reflection portion of the reflection pattern layer has a mesh shape or a shape of a plurality of spaced apart stripes.

* * * * *